United States Patent
Alarifi et al.

(10) Patent No.: US 12,398,311 B1
(45) Date of Patent: Aug. 26, 2025

(54) METHOD FOR CONSOLIDATING SAND IN HYDROCARBON RESERVOIRS

(71) Applicants: SAUDI ARABIAN OIL COMPANY, Dhahran (SA); KING FAHD UNIVERSITY OF PETROLEUM & MINERALS, Dhahran (SA)

(72) Inventors: Sulaiman A. Alarifi, Dhahran (SA); Mobeen Murtaza, Dhahran (SA); Abdul Rehman Baig, Dhahran (SA); Mohamed A. Mahmoud, Dhahran (SA); Muhammad Shahzad Kamal, Dhahran (SA); Manar M. Alahmari, Dhahran (SA); Abdulmohsen Humam, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/616,362

(22) Filed: Mar. 26, 2024

(51) Int. Cl.
*C09K 8/56* (2006.01)
*E21B 43/02* (2006.01)

(52) U.S. Cl.
CPC .............. *C09K 8/56* (2013.01); *E21B 43/025* (2013.01)

(58) Field of Classification Search
CPC . C09K 8/56; C09K 8/57; C09K 8/572; C09K 8/575; C09K 8/5758; C09K 8/5755; C09K 8/5753; C09K 8/5751; E21B 43/02; E21B 43/025
See application file for complete search history.

(56) References Cited

U.S. PATENT DOCUMENTS

| | | | |
|---|---|---|---|
| 8,420,362 B2 * | 4/2013 | Crawford | C12P 3/00 435/320.1 |
| 10,794,029 B2 | 10/2020 | He et al. | |
| 2017/0029689 A1 * | 2/2017 | Wilson | C09K 8/467 |
| 2018/0273825 A1 * | 9/2018 | Brown | C04B 28/02 |

(Continued)

FOREIGN PATENT DOCUMENTS

| | | | | |
|---|---|---|---|---|
| CN | 111732944 A | | 10/2020 | |
| CN | 117946643 A | * | 4/2024 | |
| WO | WO-2008119620 A1 | * | 10/2008 | C09K 8/506 |

OTHER PUBLICATIONS

Translation of CN-117946643-A (Year: 2024).*

(Continued)

*Primary Examiner* — Angela M DiTrani Leff
(74) *Attorney, Agent, or Firm* — Vorys, Sater, Seymour and Pease LLP (57) ABSTRACT

Preventing the flow of soil grains into oil and gas wells is highly desirable for the protection of hydrocarbon production. Geotechnical engineering solutions addressing this issue may utilize enzyme-induced precipitation methods to consolidate and increase shear strength. Methods may comprise: providing a mixture comprising urea, a urease enzyme, calcium chloride, magnesium chloride, and a cellulose; contacting at least a portion of the mixture with at least a portion of a subterranean formation; and forming a biomineral precipitate within the subterranean formation. The biomineral precipitate, comprised of a carbonate mineral and an evaporite mineral, may consolidate particles within the subterranean formation to form a consolidated body.

20 Claims, 3 Drawing Sheets

(56) References Cited

U.S. PATENT DOCUMENTS

2019/0264091 A1* 8/2019 Vorderbruggen ...... C09K 8/506
2022/0290035 A1* 9/2022 AlAhmari ............. E21B 43/025

OTHER PUBLICATIONS

DeJong, J.T., Mortensen, B.M., Martinez, B.C., Nelson, D.C., 2010. Bio-mediated soil improvement. Ecol. Eng. 36, 197-210.

AlAhmari, M., Bataweel, M., AlHumam, A., AlMajed, A., 2020. Sand Consolidation by Enzyme Mediated Calcium Carbonate Precipitation, in: Day 3 Wed, Nov. 11, 2020. SPE.

Nemati, M., 2003. Modification of porous media permeability, using calcium carbonate produced enzymatically in situ. Enzyme Microb. Technol. 33, 635-642.

Alarifi, S.A., Mustafa, A., Omarov, K., Baig, A.R., Tariq, Z., Mahmoud, M., 2022. A Review of Enzyme-Induced Calcium Carbonate Precipitation Applicability in the Oil and Gas Industry. Front. Bioeng. Biotechnol. 10, 1-20.

PCT International Search Report & Written Opinion pertaining to International Application No. PCT/US2025/020815; Date of Mailing: Jun. 18, 2025.

Alarifi, Sulaiman A. et al., A Review of Enzyme-Induced Calcium Carbonate Precipitation Applicability in the Oil and Gas Industry, Frontiers in Bioengineering and Biotechnology, vol. 10, Jun. 20, 2022, pp. 1-20.

* cited by examiner

METHOD FOR CONSOLIDATING SAND IN HYDROCARBON RESERVOIRS

FIELD OF THE DISCLOSURE

The present disclosure discloses methods of mitigating sand production issues in hydrocarbon reservoirs, such as oil and gas wells. More particularly, the present disclosure relates to methods to facilitate enhanced precipitation and consolidation of sand into a formation having high shear strength capable of withstanding the high temperatures, stresses, and strains involved in oil and gas production.

BACKGROUND OF THE DISCLOSURE

Many hydrocarbon reservoirs, e.g., oil and gas wells, encounter the problem of the flow of sand grains into the wellbore along with the reservoir fluids during production. Several problematic issues can occur due to the influx of sand into the wellbore such as liner plugging and erosion of the tubulars, separators and valves.

Enzyme-Induced calcite precipitation (EICP) methods have recently emerged as possible geotechnical engineering solutions for enhancing sandy soil's shear strength and enhancing sand consolidation that is also environmentally friendly. However, current EICP methods produce consolidated sand formations with low strength and low and inhomogeneous precipitation.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method comprises providing a mixture comprising urea, a urease enzyme, calcium chloride, magnesium chloride, and a cellulose; contacting at least a portion of the mixture with at least a portion of a subterranean formation; and forming a biomineral precipitate within the subterranean formation; wherein the biomineral precipitate consolidates particles within the subterranean formation to form a consolidated body, and the biomineral precipitate comprises a carbonate mineral and an evaporite mineral.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

(FIG. 4A), and for Solutions 2-4 (mEICP) upon 48 hr curing (FIG. 4B) and 72 hr curing (FIG. 4C) at 70° C.

DETAILED DESCRIPTION

Definitions

As used herein, the term "subterranean formation," and grammatical variants thereof, refers to naturally occurring rock beneath the Earth's surface, including subsea surfaces. Subterranean formations may be formed from a variety of natural rock including, but not limited to, carbonate-based rock (e.g., calcium carbonate ($CaCO_3$)), calcium magnesium carbonate ($CaMg(CO_3)_2$) (also referred to as dolomite), sandstone-based rock comprising clays (e.g., smectite, illite, kaolinite, chlorite, and the like), each of which include minerals (e.g., siliceous material) the like, and any combination thereof. The subterranean formations described herein encompass reservoir zones (i.e., zones comprising hydrocarbons, also referred to herein as "hydrocarbon reservoirs") and non-reservoir zones (i.e., zones that do not include hydrocarbons, such as water-producing zones). Subterranean formations where the operation fluids of the present operation may be used are not particularly limited. A suitable subterranean formation, or a hydrocarbon reservoir thereof, may comprise kerogen or organic matter. Examples of suitable subterranean formations include, but are not limited to, shales, cherts, marls, and the like. The kerogens present in a subterranean formation are not particularly limited.

As used herein, the term "subterranean formation operation," "upstream operation," and grammatical variants thereof, refers to any operation (e.g., drilling, completion, stimulation, enhanced recovery, and production) involved in production of petroleum, natural gas, as well as other resources, such as water or helium, from a subterranean formation.

As used herein, the term "subterranean formation operation fluid," and grammatical variants thereof, refers generally to any fluid designed or suitable for use in a subterranean formation operation or a downstream operation for a desired purpose.

As used herein, the term "wellbore," and grammatical variants thereof, refers to a drilled hole or borehole penetrating a subterranean formation, which may be cased (cemented) or uncased (open hole).

As used herein, a "downstream operation," and grammatical variants thereof, refers to a process involved in the conversion of products obtained from subterranean formation operations (e.g., crude oil and gas) to the final finished desired product. Examples include pipeline operations (often referred to as midstream operations) and refining operations that convert crude oil into gasoline, diesel, liquefied natural gas, heating oil, synthetic rubber, plastics, lubricants, and a variety of other products.

As used herein, the term "soil" or "sand" and grammatical variants thereof, refers to a loose surface material comprising of a body of organic or inorganic granules, e.g. a mixture of eroded rock, minerals, partly decomposed organic matter, or other materials.

Overview

The present disclosure discloses a novel geotechnical engineering solution aimed at mitigating sand production issues in hydrocarbon reservoirs, e.g., oil and gas wells, at high temperatures. More particularly, the present disclosure relates to a method to facilitate precipitation and consolidation of sand formations having high shear strength capable of withstanding the high temperatures, stresses, and strains involved in hydrocarbon, e.g., oil and gas, production.

As discussed above, there is an increasing need to prevent the flow of sand grains in oil and gas wells to protect hydrocarbon production in an economical, non-toxic fashion. EICP is a bio-cementing technique that utilizes an enzymatic reaction of urease to form a calcite (e.g., a polymorph of calcium carbonate ($CaCO_3$)) precipitate in a high temperature environment. This reaction can consolidate loose sand grains in the reservoir.

Precipitation of carbonate minerals, e.g., calcium carbonate ($CaCO_3$), magnesium carbonate, and the like) in soil via a biological reaction, including biogrouting, biomineralization, or biocalcification, has similarly been characterized in various soil stabilization methods. The majority of this field has been concerned with microbial-induced calcite precipitation (MICP), which utilizes bacteria like *Sporosarcina pasteurii* to provide the urease enzyme to hydrolyze urea to precipitate $CaCO_3$. The produced $CaCO_3$ minerals fill in and bridge between soil grains to enhance the stability of the body. In a non-biological method, e.g., EICP, a urease enzyme in the presence of a calcium salt, such as a calcium chloride (e.g., $CaCl_2$) or the like), is used to precipitate calcite (a stable polymorph of $CaCO_3$) and other carbonate minerals in a similar fashion. In addition, a magnesium salts, such as a magnesium chloride (e.g., $MgCl_2$ or the like), have been used to enhance precipitation of the EICP reaction, e.g. to precipitate carnallite. However, a main challenge of current EICP methods is increasing precipitation efficiency and sand formation strength while achieving a uniform distribution of precipitation.

Modified Enzyme-Induced Calcite Precipitation (mEICP) Methods

According to an embodiment consistent with the present disclosure are methods of enhancing sand consolidation in oil and gas production, said methods referred to herein as modified EICP (mEICP) methods. mEICP methods of the present disclosure comprise: providing a modified EICP (mEICP) reaction mixture, contacting at least a portion of the mEICP reaction mixture with at least a portion of a subterranean formation, and forming a biomineral precipitate within the subterranean formation, where the biomineral precipitate contains a carbonate and an evaporite mineral, and where the biomineral precipitate consolidates sand particles within the subterranean formation to form a consolidated body. mEICP reaction mixtures of the present disclosure result in increased efficiency and uniformity of biomineral precipitation, increased sand consolidation, increased strength and uniformity thereof of consolidated sand formations (e.g., consolidated bodies), as compared to prior art EICP reaction mixtures.

In one embodiment, the subterranean formation may be an oil and gas well. Thus, mEICP methods of the present disclosure may mitigate sand production in oil and gas wells in an environmentally sustainable fashion, while avoiding or minimally impacting oil and gas well productivity.

An mEICP method of the present disclosure may comprise providing an mEICP reaction mixture comprising a hydrolase enzyme (e.g., derived from bacteria, fungi, algae, or soil enzymes) (e.g., a urease enzyme, or the like). An mEICP reaction may further comprise a hydrolase substrate (e.g., an amidase substrate (e.g., a urease substrate, or the like)) and one or more salts capable of forming a carbonate and/or an evaporite mineral during the reaction of the hydrolase enzyme (e.g., the amidase enzyme (e.g., the urease enzyme, or the like)) and the hydrolase substrate (e.g., the amidase substrate (e.g., the urease substrate, or the like)), and a consolidation enhancement additive.

In one embodiment, the hydrolase enzyme may be an amidase enzyme. In an embodiment, the amidase enzyme is a urease enzyme capable of hydrolyzing a urease substrate (e.g., urea, hydroxyurea, or the like) into carbon dioxide and ammonia. In an embodiment, the salts form a carbonate and/or an evaporite mineral in the presence of carbon dioxide and ammonia. Exemplary salts comprise calcium salts, magnesium salts, or the like, or any combination thereof. In an embodiment, the consolidation enhancement additive is a cellulose (e.g., carboxymethylcellulose (CMC), or the like).

Accordingly, methods of the present disclosure may comprise: providing a mixture comprising urea, a urease enzyme, calcium chloride, magnesium chloride, and a cellulose; contacting at least a portion of the mixture with at least a portion of a subterranean formation; and forming a biomineral precipitate within the subterranean formation; wherein the biomineral precipitate consolidates particles within the subterranean formation to form a consolidated body, and the biomineral precipitate comprises a carbonate mineral and an evaporite mineral.

Providing a Modified EICP Reaction Mixture

In particular, an mEICP reaction mixture comprises a biocatalyst enzyme. In one embodiment, the biocatalyst enzyme may be a hydrolase enzyme that acts on carbon-nitrogen bonds, (e.g., an amidase enzyme that acts on peptide bonds). In one embodiment, the hydrolase enzyme may be an amidase enzyme. One such amidase enzyme may be urease. A urease may exhibit various enzymatic activities. Urease enzymatic activity may be at 40150 U/g, wherein one micro molar unit may yield 1 µM of ammonia ($NH_3$) from urea per minute at a pH of 7.0 at 25° C. A urease enzyme may be derived from various sources. The biocatalyst enzyme may be derived from a ureolytic agricultural source, such as a jack bean or watermelon seed. In one embodiment, the urease substrate is urea. Various concentrations of urea may be used. In one embodiment, the mEICP reaction mixture comprises at least one mole/liter (1M) of urea.

The species of salts present in an mEICP reaction mixture that act as reactants affect the crystal morphology of the mineral precipitate. An mEICP reaction mixture may comprise various species of salts. Exemplary salts comprise cations selected from, but not limited to, calcium cations, magnesium cations, sodium cations, potassium cations or the like, or any combination thereof. Exemplary salts comprise anions selected from, but not limited to, chloride anions, sulfate anions, carbonate anions, or the like, or any combination thereof. In one embodiment, salts may include calcium chloride, magnesium chloride, magnesium sulfate, sodium carbonate ($Na_2CO_3$), potassium bicarbonate ($KHCO_3$) or the like, or any combination thereof.

The inclusion of a calcium source, for example, provides the reactant capable of producing a $CaCO_3$ byproduct. The reactants may include various salts such as $CaCl_2$) or $MgCl_2$ or various mixtures thereof to provide the necessary ions for biomineral precipitation. In one embodiment, the ions provided by two or more of the salts, e.g., $Mg^{2+}$ and $Ca^{2+}$, may be present at equal concentrations within the mEICP reaction mixture. The source of calcium for the EICP reaction to yield a calcite precipitate may comprise a calcium salt. The calcium salt may be $CaCl_2$), may be in solution at a concentration of about 0.4 M to about 0.7 M, and may be a dihydrate polymorph. An additional salt modifier in the modified EICP solution may include $MgCl_2$. The modifier may be at a concentration of about 0.4 M to about 0.7 M in solution, and may be hexahydrate polymorph.

An mEICP mixture may comprise various consolidation enhancement additives to optimize sand consolidation performance by enhancing stability and viscosity. Consolidation enhancement additives may include a biodegradable biopolymer (e.g., a cross-linked hydrophilic polymer, such as a hydrogel precursor). In one embodiment, the consolidation enhancement additive may be a hydrogel precursor. Exemplary hydrogel precursors may be selected from xanthan gum, guar gum, agar agar, gellan gum, Konjac gum, locust bean gum, or a cellulosic polymer, or any combination thereof. The high degrading temperature of cellulosic materials may enhance the thermal stability of the mEICP when added.

In one embodiment, the consolidation enhancement additive may be a cellulosic polymer, or the like. Exemplary cellulosic polymers include, but are not limited to, cellulose, hydroxypropyl cellulose, carboxymethyl cellulose (CMC), methyl cellulose, hydroxypropyl methyl cellulose, microcrystalline cellulose, or the like, or any combination thereof. In one embodiment, the modified cellulose additive may be a CMC. Various CMCs may be utilized in an mEICP reaction mixture. An mEICP reaction mixture may utilize various concentrations of CMC. In one embodiment, an mEICP reaction mixture may comprise from about 1 gram/liter (g/L) to about 3 g/L of the CMC, including all g/l values and ranges therebetween (e.g., 1 g/L, 1.5 g/L, 2 g/L, 2.5 g/L, or 3 g/L). CMC may have various molecular weight values (e.g., Mn, Mw, Mz). Various analytical techniques may be used to determine the molecular weight of CMC, including but not limited to viscometry, or the like, or any combination thereof. In one embodiment, the molecular weight of CMC, as determined by viscsometry, is from about 200 g/mol to about 300 g/mol, including all g/mol values and subsets therein (e.g., 200 g/mol, 210 g/mol, 220 g/mol, 230 g/mol, 240 g/mol, 250 g/mol, 260 g/mol, 270 g/mol, 280 g/mol, 290 g/mol, or 300 g/mol).

In addition, various other additives may be added to a mEICP reaction mixture of the present disclosure to improve the fluid retention of the mixture, as well as to stabilize the enzyme or temperature regulation of the reaction. A protein such as non-fat milk, for instance, may be used to stabilize the urease enzyme in a mEICP reaction mixture. Xanthan gum, on the other hand, serves multiple roles in addition to enhancing thermal stability, such as decreasing water vapor pressure, increasing fluid retention, and serving to provide uniform distribution within the drilling fluid. Additionally, viscosity-enhanced mEICP reaction mixture may be achieved with the inclusion of a triol compound such as glycerol to act as a thickener additive, increasing the viscosity between soil particles and retaining cementation. A thermal stabilizer enhancer with a high degrading temperature, such as a cellulose (e.g., CMC, or the like), may be added to the mECIP mixture.

In one embodiment, the mEICP reaction mixture may be a solution, dispersion, emulsion, hydrogel, or the like, of the reactants (e.g., enzymes, enzyme substrates, salts, consolidation enhancement additives, other additives, and the like). In one embodiment, the mEICP reaction mixture may be aqueous (e.g., an aqueous solution, dispersion, emulsion, hydrogel, or the like).

Contacting an mEICP Reaction Mixture and a Subterranean Formation

A subterranean formation contacted by an mEICP reaction mixture may include subterranean formations of an oil and gas operation. In one embodiment, a subterranean formation may be an existing injector well, an existing producer well, a deep abandoned shallow single and/or multi-lateral well. An mEICP reaction mixture (or the reactants thereof) may be added to a fluid, e.g., an aqueous solution, for use in an oil and gas operation. The mEICP reaction mixture may be dissolved, emulsified, dispersed, or the like, in the fluid. The fluid comprising the provided mEICP reaction mixture may be a lost circulation material, described as an additive combined with drilling fluid to enhance oil recovery and prevent fluid loss. Lost circulation material may comprise the provided mEICP reaction mixture in order to consolidate sand produced during drilling operations. mEICP reaction mixtures may be added in various amounts to a fluid used in an oil and gas operation. In one embodiment, a mEICP reaction mixture concentration may be sufficient to contact about one pore volume of the mEICP reaction mixture with the subterranean formation.

The mEICP reaction mixture may be injected into a subterranean formation in a fashion similar to that of drilling fluid introduction. For example, pumping an mEICP reaction mixture through a hollow drill pipe to a drill bit, exiting the pipe, and coming into contact with the soil within the subterranean formation. The subterranean formation may be a drilled wellbore hole that may or may not be encased in material such as cement or steel. The EICP reaction mixture may stay in contact with at least a portion of the wellbore at a depth ranging 1,000 feet to about 30,000 feet, including all depth values and ranges therebetween, and for a duration of at least about 48 hours. The temperature within the wellbore that the mEICP reaction mixture can operate may range from about 25° C. to about 90° C., including all temperature values and ranges therebetween (e.g., 25° C., 30° C., 35° C., 40° C., 45° C., 50° C., 55° C., 60° C., 65° C., 70° C., 75° C., 80° C., 85° C., or 90° C.). In one embodiment, the EICP reaction mixture may operate at about 70° C. or higher. The consolidation of soil may occur when the calcite nucleates on soil grains, where cementation is occurring at point-to-point contacts and calcite crystals bridge the adjacent sand grains.

Forming a Biomineral Precipitate in the Subterranean Formation

Once in contact with a soil, the mEICP mixture may begin to form a biomineral precipitate. An mEICP reaction mixture in contact with a subterranean formation may react in situ to plug pores and restrict fluid loss by linking with soil grains. In one embodiment, an mEICP reaction mixture may be used to precipitate a biomineral precipitate comprising carbonate minerals (e.g., calcite, dolomite, or the like) in situ through an enzymatic interaction of hydrolyzing urea in the presence of the salts to precipitate carbonate and/or evaporite minerals within an oil or gas well. An mEICP method of the present disclosure may form a biomineral precipitate capable of more efficiently consolidating particles within the subterranean formation to form a consolidated body. A formed biomineral precipitate may comprises a carbonate mineral and an evaporite mineral. A formed consolidated body may have high shear strength capable of withstanding the high temperatures, stresses, and strains involved in oil and gas production.

The mEICP reaction mixture may form a biomineral precipitate when in contact with at least a portion of the subterranean formation (e.g., a wellbore) at a depth ranging about 1,000 feet (ft) to about 30,000 ft, including all ft values and ranges therebetween (e.g., 1,000 ft, 2,000 ft, 5,000 ft, 10,000 ft, 15,000 ft, 20,000 t, 25,000 ft, or 30,000 ft). The mEICP reaction mixture may form a biomineral precipitate when in contact with at least a portion of the subterranean formation (e.g., a wellbore) for a duration of time of at least 48 hours (e.g., at least 72 hours). In one embodiment, the mEICP mixture may form a biomineral precipitate when in contact with at least a portion of the subterranean formation (e.g., a wellbore) at a temperature of from about 25° C. to about 90° C., including all temperature values and ranges therebetween (e.g., 25° C., 30° C., 35° C., 40° C., 45° C., 50° C., 55° C., 60° C., 65° C., 70° C., 75° C., 80° C., 85° C., or 90° C.). In one embodiment, the EICP reaction mixture may form a biomineral precipitate at a temperature of at least about 70° C. (e.g., at least 70° C., 75° C., 80° C., 85° C., or 90° C.).

An mEICP reaction may involve reaction of calcium chloride and urea with a urease enzyme to produce a calcite precipitate. Urea undergoes hydrolysis via a bio-catalyst enzyme (e.g., a urease), breaking down the urea into ammonia and carbonic acid. The resulting carbonate may then react with available calcium ion $Ca^{2+}$ and $Mg^{2+}$ ions, e.g., in solution at equal concentration, thus precipitating a biomineral precipitates calcite and dolomite (Equations 1 and 2).

Equation 1

Equation 2

A resulting biomineral precipitate may comprise calcite, dolomite, salammoniac, carnallite, vaterite, and any combination thereof. In one embodiment, a biomineral precipitate comprises a carbonate mineral comprising calcite, dolomite, and vaterite. In one embodiment, said carbonate mineral may comprise a combined amount of calcite and dolomite of at least 8-fold greater than an amount of vaterite. In one embodiment, a biomineral precipitate may comprise an evaporite material comprising carnallite. In one embodiment, said evaporite mineral may comprise at least about 30 weight % (wt. %) of carnallite. In one embodiment, said biomineral precipitate comprises about 30 wt. % to about 70 wt. % carnallite, including all wt. % values and ranges therebetween (e.g., 30 wt. %, 35 wt. %, 40 wt. %, 45 wt. %, 50 wt. %, 55 wt. %, 60 wt. %, 65 wt. %. or 70 wt. %). In one embodiment, carnallite may be present in said biomineral precipitate in a greater amount than either calcite or dolomite. In one embodiment, the amount of carnallite in said biomineral precipitate may be at least 8-fold greater than an amount of vaterite.

A biomineral precipitate may consolidate a variety of particles within a subterranean formation. In one embodiment, a biomineral precipitate consolidates sand particles within a subterranean formation. Formation of a biomineral precipitate may be uniform along a longest length of a subterranean formation (e.g. a longest length of an oil and gas well or fracture therein).

Consolidation of particles within a subterranean formation may produce consolidated bodies having various sizes and shapes corresponding to the size and shape of the subterranean formation where consolidation occurs. In one embodiment, a consolidated body may have the size and shape of an oil and gas well or any subsurface structure in contact with said oil and gas well, e.g., rock layers, faults, and fractures. Said consolidated body will have a longest dimension, e.g., longest length, corresponding to the longest dimension, e.g., longest length, of said subterranean formation.

Consolidated bodies may have various consolidated strengths. A consolidated body may have a consolidated strength (also referred to herein as Intrinsic Specific Energy (ISE)) as measured by the scratch test (equipment provided by EPSLOG Engineering) in accordance with the Standard Test Method for Determination of Mohs Scratch Hardness (ASTM C1895-20). In one embodiment, a consolidated body may have a consolidated strength (ISE), as measured by scratch test, of from about 450 psi to about 1100 psi, including all psi values and ranges therebetween (e.g., 450 psi, 500 psi, 550 psi, 600 psi, 650 psi, 700 psi, 750 psi, 800 psi, 850 psi, 900 psi 950 psi, 1000 psi, 1050 psi, or 1100 psi).

Consolidation of uniformly distributed biomineral precipitates within a subterranean formation may produce a consolidated body having uniform structure, uniform composition, and uniform properties. In one embodiment, a consolidated body has a distribution of consolidated strength (ISE) along a longest length of the consolidated body (e.g., corresponding to a longest length of a subterranean formation). A consolidated body may comprise a uniform distribution, along a longest length of the consolidated body, of consolidated strength (ISE) of about ±100 psi, as measured by the scratch test, Multiple rounds of the methods of the present disclosure may be performed. In one embodiment, a method is performed at least two (2) times (e.g., 2, 3, 4, 5, 6, 7, 8, 9, 10, or more times). A method of the present disclosure may be repeatedly performed until a formed consolidated body is formed having a desired consolidation strength and/or uniformity of distribution (e.g., ISE of from about 450 to about 1100 psi, ISE distribution of about ±100 psi). In one embodiment, a method of the present disclosure may be repeatedly performed until ISE value and/or ISE distribution value of a formed consolidated body is increased at least 2 fold (e.g., 2, 3, 4, 5, 6, 7, 8, 9, 19 or more) over the ISE value and/or ISE distribution values of a formed body after a single round of the method is performed. In one embodiment, a method of the present disclosure may be repeatedly performed until a biomineral precipitate fills at least one (1) pore volume of the subterranean formation (e.g., 1, 2, 3, 4, 5, 6, 7, 8, 9, 10, or more pore volumes).

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments disclosed herein include:

A. A method comprising: providing a mixture comprising urea, a urease enzyme, calcium chloride, magnesium chloride, and a cellulose; contacting at least a portion of the mixture with at least a portion of a subterranean formation; and forming a biomineral precipitate within the subterranean formation; wherein the biomineral precipitate consolidates particles within the subterranean formation to form a consolidated body, and the biomineral precipitate comprises a carbonate mineral and an evaporite mineral.

Embodiment A may have one or more of the following additional elements in any combination.

Element 1: wherein the mixture is an aqueous fluid.

Element 2: wherein the cellulose comprises carboxylmethyl cellulose (CMC).

Element 3: wherein the mixture comprises at least about 1 gram/liter (g/L) of CMC.

Element 4: wherein the mixture comprises from about 1 g/L to about 3 g/L of CMC.

Element 5: wherein contacting at least a portion of the mixture with at least a portion of a subterranean formation comprises contacting about one pore volume of the mixture with a subterranean formation.

Element 6: wherein forming a biomineral precipitate within the subterranean formation occurs at a temperature of at least about 70° C.

Element 7: wherein the particles within the subterranean formation comprise sand particulates.

Element 8: wherein the consolidated body is formed for a time of at least about 48 hours.

Element 9: wherein the consolidated body is formed for a time of from about 48 hours to about 72 hours.

Element 10: wherein the consolidated body has an average consolidated strength (ISE) of from about 450 to about 1100 psi, as measured by ASTM C1895-20.

Element 11: wherein the consolidated body has a distribution of consolidated strengths (ISEs) along a longest length of the consolidated body of about ±100 psi, as measured by ASTM C1895-20.

Element 12: wherein the carbonate mineral comprises calcite, dolomite, and vaterite.

Element 13: wherein a combined amount of calcite and dolomite in the biomineral precipitate is at least 8-fold greater than an amount of vaterite.

Element 14: wherein the evaporite mineral comprises carnallite.

Element 15: wherein the biomineral precipitate comprises at least about 30 weight percent (wt. %) carnallite.

Element 16: wherein the biomineral precipitate comprises about 30 wt. % to about 70 wt. % Carnallite.

Element 17: wherein carnallite is present in the biomineral precipitate in a greater amount than either calcite or dolomite.

Element 18: wherein the amount of carnallite in the biomineral precipitate is at least 8-fold greater than an amount of vaterite.

Element 19: wherein multiple rounds of the method are performed.

By way of non-limiting example, exemplary combinations applicable to A: Element 1 and 2, Element 2 and 3, Element 3 and 4, Element 1 and 5, Element 1 and 6, Element 1 and 7, Element 1 and 8, Element 1 and 9, Element 1 and 10, Element 10 and 11, Element 1 and 12, Element 9 and 13, Element 1 and 14, Element 11 and 15, Element 12 and 16, Element 11 and 17, Element 11 and 18, and Element 1 and 19.

Example 1

A study was performed to observe the enhancing effect cellulose concentrations added to an EICP reaction mixture would have on the consolidation of a body of soil.

Mixture Preparation

An EICP reaction mixture was prepared by mixing Deionized water, urea (($NH_2$)$_2$CO, >99.5% purity), calcium chloride dihydrate ($CaCl_2 \cdot 2H_2O$, >99% purity), magnesium chloride hexahydrate ($MgCl_2 \cdot 6H_2O$), a high activity urease enzyme extracted from jack beans (Sigma Aldrich), and carboxymethylcellulose (CMC) in varying quantities.

Different solution samples were created in test tubes to investigate the influence of enzymes and CMC on calcium carbonate ($CaCO_3$) precipitation. Solution 1 (standard EICP reaction mixture) was prepared by dissolving 3 g/L of enzymes, along with 0.67 M calcium chloride, 0.67 M magnesium chloride, and 1.0 M urea in deionized water. Solutions 2-4 (modified EICP ("mECIP") reaction mixtures) are identical to Solution 1 (standard EICP) except for the addition of CMC. Solutions 2, 3, and 4 contained 1 g/L, 2 g/L, and 3 g/L of CMC, respectively. All solutions were prepared using deionized water.

Test Tube Preparation

Figure 1:
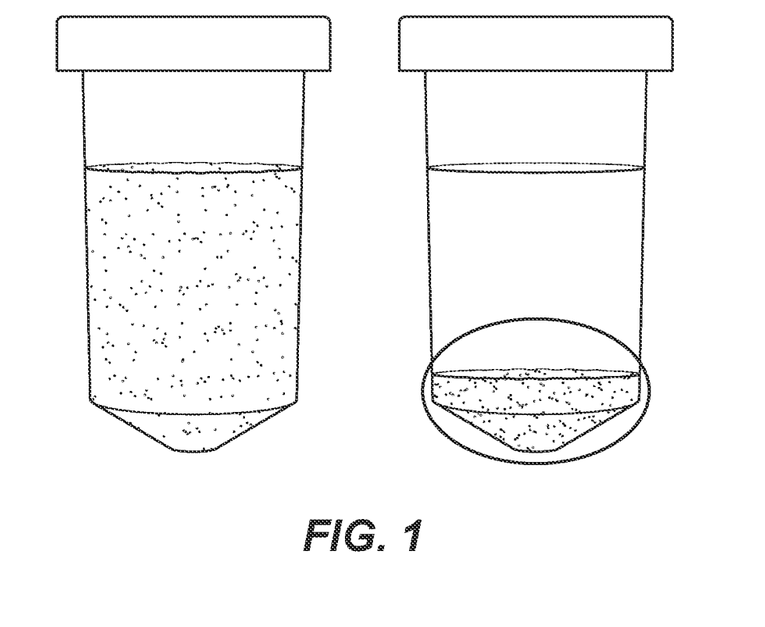
FIG. 1 shows test tubes containing exemplary modified EICP (mEICP) reaction mixtures before (left) and after (right) curing for 48 hours at 70° C.

The four test tubes were prepared with the solution samples mentioned above. The plastic test tubes were filled with 40 ml of the solution. To reduce solution evaporation, solution samples were then closed with plastic caps. Test tubes with Solutions 1-4 were cured for 48 hours at 70° C. Each test tube was then uncapped and dried for 72 hours at the same temperature as the curing temperature and over-dried at a temperature of 90° C. for 48 hours. FIG. 1 shows a test tube containing an exemplary EICP solution before (left) and after (right) curing. Each test tube's precipitation was then filtered, dried in the oven, and submitted to XRD examination and SEM Analysis.

Results

Mass of Precipitation: The experimental findings demonstrated a clear pattern: an increase in CMC concentrations corresponded to a proportional increase in the amount of precipitation. This correlation is shown in Table 1 below, where the sample without CMC exhibited the lowest precipitation mass of 6.16 grams. Conversely, as the CMC concentration rose to 1 g/L, the mass of precipitation increased to 8.53 grams. Further, a concentration of 3 g/L resulted in an even higher value of 13.14 grams.

TABLE 1

| Solution | Curing Temperature | Mass (grams) |
| --- | --- | --- |
| 1 | 70° C. | 6.16 |
| 2 | 70° C. | 8.53 |
| 3 | 70° C. | 12.61 |
| 4 | 70° C. | 13.14 |

XRD Analysis: XRD analysis was carried out to determine the mineral constituents of precipitation (e.g., the type of calcium carbonate polymorph). In solution 1, the formation of calcite and dolomite was the most prominent, while the solutions containing CMC exhibited a notable presence of carnallite. The solution prepared with 3 g/L of CMC contained 65.1% carnallite. The findings revealed that as the concentration of CMC increased, there was a corresponding increase in the percentage of carnallite and a decrease in the percentage of calcite (Table 2).

TABLE 2

| Solution | Composition |
| --- | --- |
| 1 | 53.5% Calcite, 44.6% Dolomite, and 1.9% Salammoniac |
| 2 | 53% Calcite, 4.6% Dolomite, 39.4% Carnallite, 2% Salammoniac and 1% Vaterite |
| 3 | 42.1% Calcite, 4.8% Dolomite, 47.7% Carnallite and 5.4% Vaterite |
| 4 | 34.3% Calcite, 0.3% Dolomite, 65.1% Carnallite and 0.3% Vaterite |

SEM Analysis: Scanning electron microscopy (SEM) imaging was performed to show the sand sample's morphology (e.g., the morphology of the calcium carbonate precipitation). SEM images of solution 1 showed fine calcite and dolomite polymorph while the SEM image of Solutions 2-4 showed the flat surface of carnallite along with calcite.

Sand Column Experiment

Figure 2:
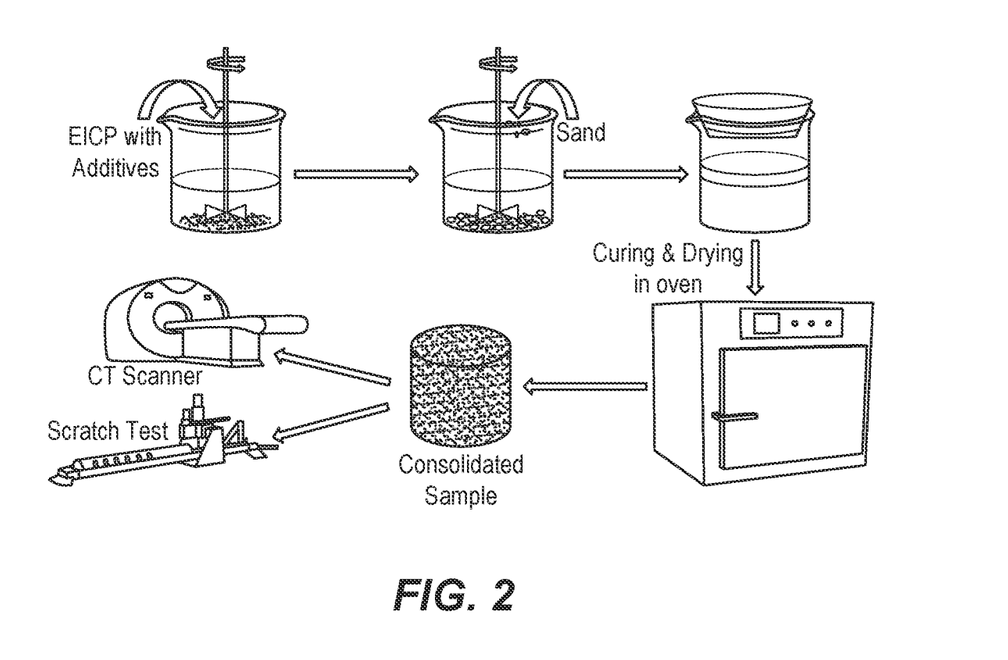
FIG. 2 shows a schematic of the sand column experiment for a standard EICP reaction mixture (Sample 1) and mEICP reaction mixtures (Samples 2-4).

To study how EICP solution affects calcite and dolomite precipitation, a sand column experiment was performed as shown in the schematic of FIG. 2. Specimens were made in plastic containers with sand inside. The test samples were prepared by mixing 150 g of sand with 40 ml of EICP solution (approximately one pore volume). The sand and solution were then mixed in plastic containers, containers were carefully tapped until a solution rose a few millimeters above the soil's surface indicating that the packed soil was almost saturated. The plastic caps were then placed on the plastic containers to prevent the fluid from evaporating. The containers prepared from solutions 1-4 were given a minimum of 48 hours to cure at a temperature of 70° C.

Figure 3:
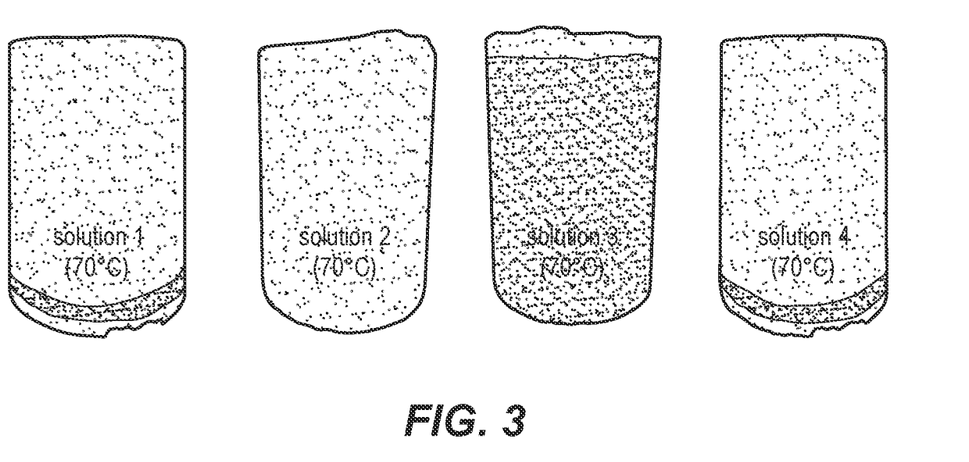
FIG. 3 shows consolidated samples obtained using a standard EICP (Solution 1) or modified EICP (mEICP) (Solutions 2-4) reaction mixtures after drying.

Following the curing process, the containers containing solutions 1, 2, 3, and 4 were subjected to a drying process in an oven for 72 hours at the same temperature as the curing temperature. Subsequently, they were over-dried for an additional 72 hours at 90° C. After drying, the consolidated samples were gently tapped from the backside of the container to facilitate their removal. FIG. 3 shows the consolidated samples after drying. Additional samples were fabricated using the same solutions, with the only variation being an increased curing time from 48 hours to 72 hours. The subsequent drying and over drying durations remained unchanged from the previous experiments.

Scratch test: A scratch test was performed to assess how well the sand consolidation method using Solutions 1-4 increased the strength and durability of the sand formations. In this scenario, the surface of the consolidated sand sample was intentionally scratched or grooved while measuring the force needed to do so using the scratch test machine. The intrinsic strength of the consolidated sand, a measurement of its capacity to withstand the stresses and strains involved in oil and gas production, was then calculated using this force. Scratch test in accordance with Standard Test Method for Determination of Mohs Scratch Hardness ASTM C1895-20. ISE stands for Intrinsic Specific Energy.

Figure 4A:
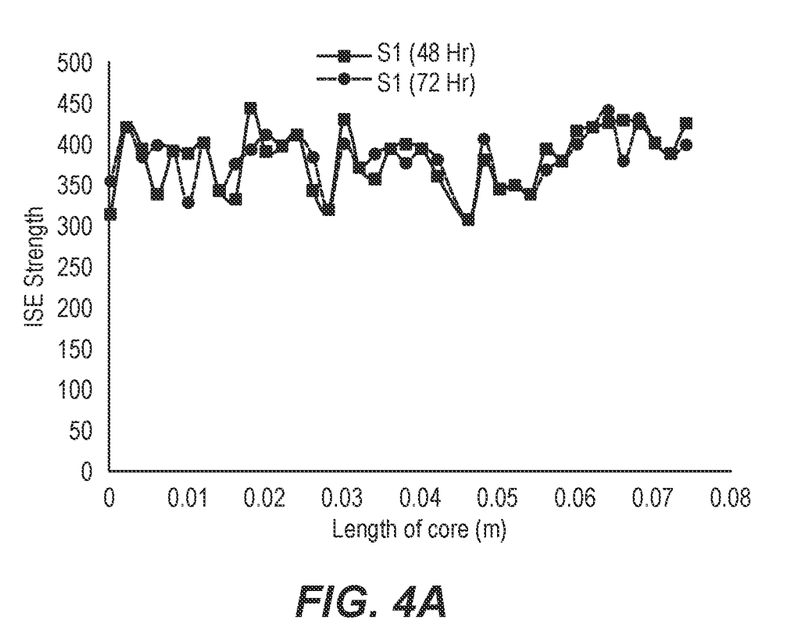
FIGS. 4A-4C show the relationship between the concentration of CMC in the EICP solution and the strength of the consolidated body. ISE strength vs. length of the core is shown for Solution 1 (standard EICP) upon 48 hour (hr) and 72 hr curing at 70° C.

EICP Solution without CMC: A scratch test was performed on an EICP solution without the addition of CMC, resulting in a strength measurement of 350 psi. After allowing the solution to cure for a period of three days, the strength noticeably improved to 370 psi (Table 3, FIG. 4A). This increase in strength can be attributed to the formation of calcite and dolomite precipitates (Table 2).

TABLE 3

| Solution | Curing Temperature | Curing Time (hours) | ISE Strength (psi) |
| --- | --- | --- | --- |
| 1 | 70° C. | 48 | 350 |
|   |        | 72 | 370 |
| 2 | 70° C. | 48 | 460 |
|   |        | 72 | 485 |
| 3 | 70° C. | 48 | 848 |
|   |        | 72 | 876 |
| 4 | 70° C. | 48 | 1081 |
|   |        | 72 | 1100 |

Effect of CMC with EICP Solution: The scratch test was conducted on specimens that were prepared using solutions 2-4, that was cured for 72 and 48 hours. The specimen prepared with solution 4, which had a concentration of 3 g/L CMC, exhibited the highest strength of 1100 psi, while the specimen prepared with solution 2, with a concentration of 1 g/L CMC, showed the lowest strength of 485 psi. Notably, there was a clear trend of increasing strength with higher concentrations of CMC. Additionally, FIGS. 4B-4C revealed that longer curing times were associated with improved strength of the consolidated specimens. This positive correlation between curing time and strength was observed consistently across all specimens.

Figure 4B:
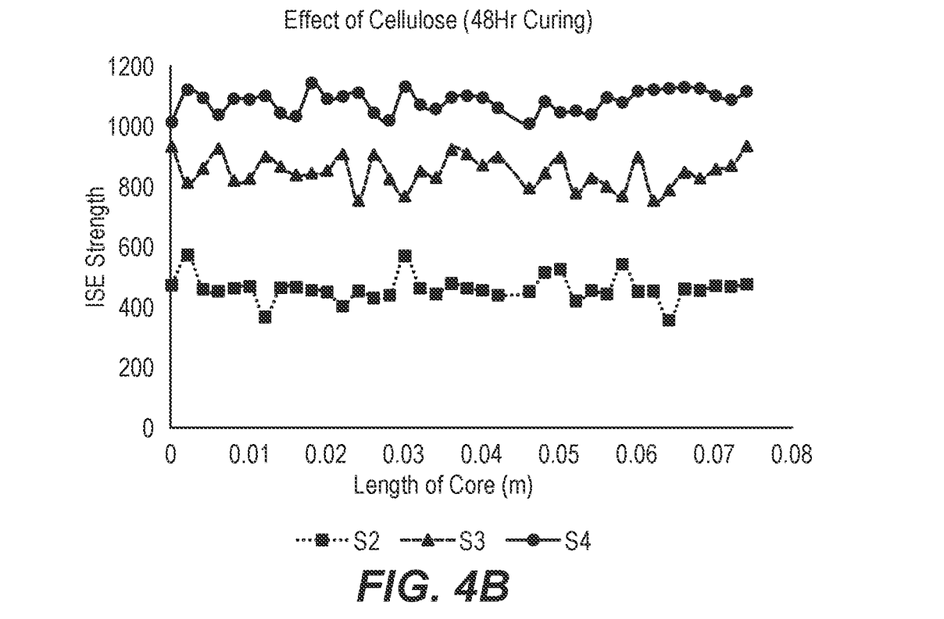
Figure 4C:
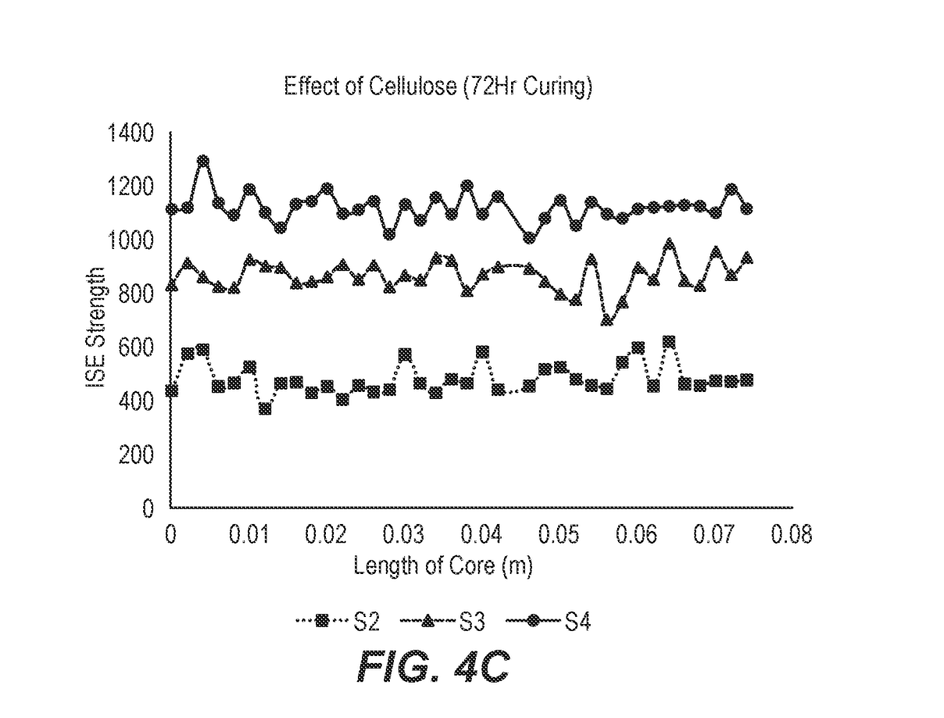

As the concentration of CMC rose, FIG. 4B-4C clearly show the strength of the cemented sand samples also increased. Despite the fact that these samples' strengths did vary along the length of the core, the difference was not very large, around 100 psi. These findings imply that CMC concentration is a significant factor in determining the strength of the consolidated sand samples. Adding CMC to EICP solution resulted in a significant increase in strength under moderate temperature condition.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
   providing a mixture comprising urea, a urease enzyme, calcium chloride, magnesium chloride, and a cellulose;
   contacting at least a portion of the mixture with at least a portion of a subterranean formation; and
   forming a biomineral precipitate within the subterranean formation;
   wherein the biomineral precipitate consolidates particles within the subterranean formation to form a consolidated body, and the biomineral precipitate comprises a carbonate mineral and an evaporite mineral,
   wherein the biomineral precipitate comprises about 30 wt. % to about 70 wt. % carnallite.

2. The method of claim 1, wherein the mixture is an aqueous fluid.

3. The method of claim 1, wherein the cellulose comprises carboxy methyl cellulose (CMC).

4. The method of claim 3, wherein the mixture comprises from about 1 g/L to about 3 g/L of the carboxymethyl cellulose (CMC).

5. The method of claim 1, wherein contacting at least a portion of the mixture with at least a portion of a subterranean formation comprises contacting about one pore volume of the mixture with a subterranean formation.

6. The method of claim 1, wherein forming a biomineral precipitate within the subterranean formation occurs at a temperature of about 25° C. to about 90° C.

7. The method of claim 1, wherein the particles within the subterranean formation comprise sand particulates.

8. The method of claim 1, wherein forming a biomineral precipitate within the subterranean formation occurs for a time of from about 48 hours to about 72 hours.

9. The method of claim 1, wherein the consolidated body has an average consolidated strength (ISE) of from about 450 to about 1100 psi, as measured by ASTM C1895-20.

10. The method of claim 1, wherein the consolidated body has a distribution of consolidated strengths (ISEs) along a longest length of the consolidated body of about ±100 psi, as measured by ASTM C1895-20.

11. The method of claim 1, wherein the carbonate mineral comprises calcite, dolomite, and vaterite.

12. The method of claim 1, further comprising:
    contacting at least one additional portion of the mixture with at least a portion of a subterranean formation; and
    forming at least one additional biomineral precipitate within the subterranean formation.

13. A method comprising:
    providing a mixture comprising urea, a urease enzyme, calcium chloride, magnesium chloride, and a cellulose;
    contacting at least a portion of the mixture with at least a portion of a subterranean formation; and
    forming a biomineral precipitate within the subterranean formation;
    wherein the biomineral precipitate consolidates particles within the subterranean formation to form a consolidated body, and the biomineral precipitate comprises a carbonate mineral and an evaporite mineral, and
wherein the biomineral precipitate comprises carnallite in a greater amount than either calcite or dolomite.

14. The method of claim 13, wherein the mixture is an aqueous fluid.

15. The method of claim 13, wherein the cellulose comprises carboxymethyl cellulose (CMC).

16. The method of claim 15, wherein the mixture comprises from about 1 g/L to about 3 g/L of the carboxymethyl cellulose (CMC).

17. The method of claim 13, wherein contacting at least a portion of the mixture with at least a portion of a subterranean formation comprises contacting about one pore volume of the mixture with a subterranean formation.

18. The method of claim 13, wherein forming a biomineral precipitate within the subterranean formation occurs at a temperature of about 25° C. to about 90° C.; and/or for a time of from about 48 hours to about 72 hours.

19. The method of claim 13, wherein the particles within the subterranean formation comprise sand particulates.

20. The method of claim 13, wherein the consolidated body has an average consolidated strength (ISE) of from about 450 to about 1100 psi, as measured by ASTM C1895-20; and/or
wherein the consolidated body has a distribution of consolidated strengths (ISEs) along a longest length of the consolidated body of about ±100 psi, as measured by ASTM C1895-20.

* * * * *